United States Patent Office 3,641,151
Patented Feb. 8, 1972

3,641,151
LIQUID CHLORINATED POLYARYL-POLYAMINE COMPOSITIONS
Michael Kokorudz, Grosse Ile, Mich., assignor to Wyandotte Chemicals Corporation, Wyandotte, Mich.
No Drawing. Filed May 21, 1969, Ser. No. 826,717
Int. Cl. C07c *87/28, 91/42*
U.S. Cl. 260—570 D      2 Claims

ABSTRACT OF THE DISCLOSURE

Liquid chlorinated polyaryl-polyamine compositions are prepared by condensing, in the presence of water and sulfuric and/or hydrochloric acid, formaldehyde with o-chloroaniline in a mole ratio of o-chloroaniline to formaldehyde of from 2:1.05 to 2:1.5. The compositions are useful as curing agents for polyurethane prepolymers.

---

The present invention relates to liquid chlorinated polyaryl-polyamine compositions which are useful as curing agents for polyurethanes. More particularly, the invention relates to liquid chlorinated polyaryl-polyamine compositions which are prepared by condensing in an aqueous medium in the presence of sulfuric acid or hydrochloric acid, o-chloroaniline with formaldehyde in a mole ratio of o-chloroaniline to formaldehyde of from 2:1.05 to 2:1.5.

The preparation of polyaryl-polyamines by the reaction of aniline or substituted anilines with formaldehyde in the presence of an acid as well as the use of these polyamines as curing agents for polyurethanes are well known in the art as evidenced by U.S. Pats. Nos. 3,253,031; 3,408,301; and 3,412,071. The polyamine most conventionally employed as a curing agent for polyurethanes is 4,4'-methylene bis(o-chloroaniline) which is prepared by condensing o-chloroaniline with formaldehyde in a mole ratio of o-chloroaniline to formaldehyde of at least 2:1. A major disadvantage of 4,4'-methylene bis(o-chloroaniline) resides in the fact that it is a solid and must be melted before employed in the cure of polyurethanes. Melting this diamine requires heating it to a temperature of about 100° C. When employed in the formulation of polyurethanes, the melted diamine tends to solidify before it is completely blended with the other ingredients, or, alternatively, the other ingredients must be heated to sufficiently high temperatures so that the 4,4'-methylene bis(o-chloroaniline) will remain liquid and these high temperatures generally have a deleterious effect on the properties of the polyurethanes. Moreover, this diamine is somewhat toxic and because it is a solid, care must be taken to avoid dust inhalation. Reference is made to the latter two above-mentioned patents for a detailed discussion of the disadvantages associated with 4,4'-methylene bis(o-chloroaniline).

It is an object of the present invention to provide for liquid chlorinated polyaryl-polyamine compositions. Another object of the present invention is to provide for liquid chlorinated polyaryl-polyamine compositions prepared from o-chloroaniline and formaldehyde. Still another object of the present invention is to provide for liquid chlorinated polyaryl-polyamine compositions which are effective curing agents for polyurethanes. These and other objects of the present invention will be apparent from the specification and examples which follow.

The above objects are accomplished by condensing in an aqueous medium in the presence of sulfuric acid or hydrochloric acid, o-chloroaniline with formaldehyde in a mole ratio of o-chloroaniline to formaldehyde of from 2:1.05 to 2:1.5, preferably from 2:1.1 to 2:1.3. It was highly surprising and unexpected to discover that if a stoichiometric excess of formaldehyde is employed in the above-described condensation reaction, liquid chlorinated polyaryl-polyamine compositions are obtained which, when employed as curing agents for polyurethanes, possess surprisingly long pot lifes, permit processing at low temperatures and do not affect the physical properties of the polyurethanes.

As mentioned above, the compositions of the present invention are prepared by condensing in an aqueous medium o-chloroaniline with formaldehyde in the presence of hydrochloric and/or sulfuric acid. The amount of acid employed in the preparation of the liquid polyamine compositions of the invention is not critical. Generally, however, from 0.10 to 1.0, preferably from 0.25 to 0.75 mole equivalent of acid per mole of o-chloroaniline will be employed. The condensation reaction is carried out in the presence of water. Generally, from one part to five parts of water per part of acid is employed in the condensation reaction. The condensation is generally carried out at temperatures between 50° C. to 100° C., preferably from 80° C. to 100° C., at atmospheric pressure although sub- or superatmospheric pressure may be employed if desired.

The reactants can be mixed in any order but a particularly advantageous procedure comprises dissolving the o-chloroaniline in an aqueous acid and then adding the formaldehyde to the resulting solution. The process of dissolving the o-chloroaniline in an acid is normally exothermic. The formaldehyde can be added to the acidic solution of o-chloroaniline at room temperature but it is preferably added while the o-chloroaniline solution is maintained at a temperature from 60° C. to 100° C. The formaldehyde can be added in any of the various forms in which it is normally available including paraformaldehyde, but is preferably added in the form of its concentrated aqueous solution.

The reaction period varies according to the nature of the reactants and the temperature employed and is generally of the order of one to five hours. When the reaction is completed, the reaction mixture is neutralized with a base such as sodium hydroxide. Upon standing, the reaction mixture forms two layers which are separated by conventional procedures. The lower layer is then stripped at temperatures of from 135° C. to 140° C. and under three to five millimeters of mercury. The distillate is then filtered by conventional procedures.

As mentioned above, the liquid chlorinated polyaryl-polyamine compositions of the present invention may be advantageously employed as curing agents for polyurethane prepolymers. As is well known to those skilled in the art, polyurethane prepolymers are prepared by the reaction of an organic polyisocyanate with an organic polyol having at least two active hydrogen atoms. The reaction generally occurs at temperatures between 25° C. and 150° C. optionally in the presence of a catalyst and/or diluent. The use of the liquid compositions of the present invention as curing agents for polyurethane prepolymers results in compositions having longer pot lifes and improved handling properties over conventionally employed curing agents without significantly decreasing the physical properties of the resulting cured polyurethanes.

Illustrative organic polyisocyanates which may be employed in the preparation of the polyurethane prepolymers cured in accordance with the present invention include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate, and tolylene 2,4,6-triisocyanate; and the tetraisocyanates such as 4,4'-dimethyldiphenylmethane 2,2',5,5' - tetraisocyanate. Especially useful due to their availability and properties are tolylene diisocyanate, diphenylmethane-4,4'-diisocyanate, and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

Representative of the organic polyols which may be employed in the preparation of the prepolymers cured in accordance with the present invention are those polyols having at least two active hydrogen atoms. The term "active hydrogen atoms" refers to hydrogen atoms which, because of their position in the molecule, display activity according to the Zerewitinoff test as described by Kohler in J. of Am. Chem. Soc., 49, 3181 (1927). Representative organic polyols include polyhydroxyl-containing polyesters, polyalkylene polyether polyols, polyhydroxy-terminated polyurethane polymers, polyhydroxyl-containing phosphorus compounds, aliphatic polyols, and alkylene oxide adducts of polyhydric polythioethers, polyacetals, aliphatic thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2 - (4,4'-hydroxyphenol)propane, common known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block coolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)-propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in copending U.S. patent application Ser. No. 728,840, filed May 13, 1968. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6 - hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, and 2,4-diamino toluene; aliphatic amines such as methyl amine, triisopropanol amine, ethylene diamine, 1,3-propylene diamine, 1,4-butylene diamine, and 1,3-butylene diamine.

Other compounds which do not necessarily fit within any of the previously set forth clases of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

If desired, catalysts may be employed for the urethane reaction. Any of the standard polyurethane catalysts such as amine and metal salts may be employed. Examples of such catalysts include N-methyl morpholine, triethylene amine, triethylene diamine, tetramethyl ethylene diamine, lead naphthenate, dibutyltin dilaurate, sodium stearate, and zinc octoate.

The fact that the liquid chlorinated polyamine compositions of the present invention possess a pot life longer than do conventional polyamine curatives, particularly, 4,4'-methylene bis(o-chloroaniline) enables them to be useful in many applications heretofore unavailable to amine-cured polyurethanes. Moreover, the compositions of the present invention possess the desirable property, once curing commences, of providing substantially fully cured products in a short period of time. Examples of applications now available to amine-cured polyurethanes include those situations wherein the polyurethane reaction mixture must flow through relatively narrow passages and in the preparation of high-rise foam panels and non-cellular cast elastomers.

The following examples illustrate the invention. All parts are by weight unless stated otherwise.

In the examples which follow, the following ASTM testing procedures were employed:

| | |
|---|---|
| Tensile strength | D-412 |
| Modulus | D-412 |
| Elongation | D-412 |
| Split tear | D-470 |
| Graves tear | D-624 |
| Hardness | D-2240 |
| Compression set | D-395 |

EXAMPLE I

A reaction vessel equipped with a thermometer, stirrer, condenser, gas and liquid inlet means, and heat exchange means was charged with 3060 parts (24 moles) of o-chloroaniline. With good stirring, 600 parts of 50% sulfuric acid was added to the charge while heating to 80° C. Over a period of one hour, 1161 parts of 37% formalin (14.3 moles formaldehyde) was added to the reaction vessel maintaining the reaction temperature between 95° C. and 100° C. The reaction mixture was stirred at a temperature of 90° C. to 97° C. for three hours at which time 960 parts of 25% sodium hydroxide was added to the reaction mixture. The reaction mixture was allowed to separate into two layers. The lower layer was then stripped at a temperature of 135° C. to 140° C. under three millimeters of mercury. The distillate was filtered. The product, 3180 parts (98% conversion), was a pale yellow liquid which analyzed 11.1% amine, 26.2% chlorine and a Rast molecular weight of 328.

EXAMPLE II

A reaction vessel equipped as described in Example I was charged with 1020 parts (8.0 moles) of o-chloroaniline. With good stirring, 200 parts (2.0 moles) of hydrochloric acid in 100 parts of water was added to the charge while heating to 80° C. Over a period of thirty minutes, 87 parts of formalin (4.77 moles of formaldehyde) was added to the reaction vessel maintaining the temperature around 100° C. The reaction mixture was stirred at this temperature for about three hours at which time 100 parts of sodium hydroxide in 100 parts of water was added to neutralize the reaction mixture. Separation of the two layers which resulted and distillation of the bottom layer yielded 979 parts (92% conversion) of liquid polyamine product which analyzed 11.8% amine, and a Rast molecular weight of 30%.

EXAMPLES III–IX

Following the procedure described in Example I, a series of products was prepared employing sulfuric acid as catalyst in an amount equal to 0.25 mole equivalent per mole of o-chloroaniline. All products were prepared at 100° C. and the reaction time was three hours. The only variable was the mole ratio of o-chloroaniline to formaldehyde. The results as presented in Table I below, indicate that liquid chlorinated polyamine compositions prepared from o-chloroaniline and formaldehyde are obtained if the mole ratio of o-chloroaniline to formaldehyde is maintained between 2:1.05 to 2:1.5.

TABLE I

| Example | Mole ratio of o-chloroaniline/ formaldehyde | Product | |
|---|---|---|---|
| | | Physical state | Percent NH$_2$ |
| III | 2:1.00 | Semi-solid | |
| IV | 2:1.05 | Liquid | 11.8 |
| V | 2:1.14 | do | 12.8 |
| VI | 2:1.20 | do | 10.4 |
| VII | 2:1.25 | do | 10.0 |
| VIII | 2:1.33 | do | 10.8 |
| IX | 2:1.50 | do | 12.6 |

EXAMPLE X

This example demonstrates the preparation of polyurethane polymers employing the liquid compositions of the present invention as curing agents for an isocyanate-terminated polyether-based prepolymer. The prepolymer was prepared by the reaction of thirteen equivalents of a mixture containing 80% 2,4- and 20% 2,6-toluene diisocyanate with four equivalents of a 700 molecular weight polypropylene glycol, two equivalents of a 1300 molecular weight polypropylene glycol, and one equivalent of a 1500 molecular weight propylene oxide adduct of trimethylolpropane. The prepolymer had an unreacted isocyanate content of 5.3%. An equivalent ratio of NCO/NH$_2$ of approximately 1:1 was employed in the preparations herein described. The pot life and physical properties of the composition are presented in Table II.

TABLE II

| Curing agent | Pot life at 100° C., minutes | Tensile strength p.s.i. | 100% modulus | Elongation, percent | Split tear p.s.i. | Graves tear | Shore A hardness | Shore D hardness | Compression set, percent | Bashore resilience |
|---|---|---|---|---|---|---|---|---|---|---|
| 4,4'-methylene bis(o-chloroaniline) | 8 | 4,500 | 1,400 | 370 | 80 | 260 | 94-90 | 46-42 | 20.0 | 25 |
| Composition of— | | | | | | | | | | |
| Example I | 15 | 4,500 | 1,300 | 295 | 100 | 240 | 93-89 | 43-35 | 16.9 | 25 |
| Example V | 15 | 3,900 | 1,116 | 300 | 100 | 240 | 94-90 | 40-35 | 19.5 | 25 |
| Example VI | 12 | 4,060 | 1,223 | 293 | 100 | 264 | 95-91 | 45-35 | 20.0 | 23 |
| Example VII | 14 | 3,633 | 1,243 | 260 | 100 | 240 | 96-93 | 47-39 | 16.0 | 20 |

EXAMPLE XI

This example demonstrates the preparation of polyurethane polymers employing the liquid compositions of the present invention as curing agents for a isocyanate-terminated polyether-based prepolymer. The prepolymer was prepared by the reaction of fourteen equivalents of a mixture containing 80% 2,4- and 20% 2,6-toluene diisocyanate with four equivalents of a 1000 molecular weight polypropylene glycol, four equivalents of propylene glycol and one equivalent of a 700 molecular weight propylene oxide adduct of trimethylolpropane. The prepolymer had

TABLE III

| Curing agent | Pot life at 100° C., minutes | Tensile strength p.s.i. | 100% modulus | Elongation, percent | Split tear p.s.i. | Graves tear | Shore A hardness | Shore D hardness | Compression set, percent | Bashore resilience |
|---|---|---|---|---|---|---|---|---|---|---|
| 4,4'-methylene bis(o-chloroaniline) | 3 | 6,000 | 3,600 | 220 | 115 | 510 | 100 | 71-68 | 30.0 | 27 |
| Composition of— | | | | | | | | | | |
| Example I | 5 | 5,930 | 3,300 | 215 | 240 | 530 | 96 | 75-65 | 40.2 | 33 |
| Example V | 5 | 6,100 | 2,650 | 240 | 230 | 500 | 100 | 69-64 | 45.0 | 30 |
| Example VI | 5 | 6,000 | 3,020 | 215 | 240 | 550 | 97 | 72-68 | 37.6 | 35 |
| Example VII | 5 | 5,817 | 3,577 | 170 | 250 | 570 | 100 | 73-69 | 30.2 | 34 | an unreacted isocyanate content of 4.7%. An equivalent ratio of $NCO/NH_2$ of approximately 1:1 was employed in the preparations herein described. The pot life and physical properties of the composition are presented in Table III.

What is claimed is:

1. A liquid chlorinated polyaryl-polyamine composition prepared by condensing at a temperature between 50° C. and 100° C. in an aqueous medium in the presence of sulfuric acid or hydrochloric acid, o-chloroaniline with formaldehyde, the mole ratio of o-chloroaniline to formaldehyde being from 2:1.05 to 2:1.5, the amount of acid employed being from 0.1 to 1.0 mole equivalent per mole of o-chloroaniline.

2. The composition of claim 1 wherein the mole ratio of o-chloroaniline to formaldehyde is from 2:1.1 to 2:1.3.

References Cited

UNITED STATES PATENTS

| | | | |
|---|---|---|---|
| 2,818,433 | 12/1957 | Erickson | 260—570 |
| 3,297,758 | 1/1967 | Hoeschele | 260—570 |
| 3,297,759 | 1/1967 | Curtiss et al. | 260—570 |
| 3,358,025 | 12/1967 | Foster et al. | 260—570 |
| 3,367,969 | 2/1968 | Perkins | 260—570 |
| 3,379,691 | 4/1968 | Sundholm | 260—75 |
| 3,393,239 | 7/1968 | Wolfe | 260—570 |
| 3,478,099 | 11/1969 | Ross et al. | 260—570 |

DONALD E. CZAJA, Primary Examiner

R. W. GRIFFIN, Assistant Examiner

U.S. Cl. X.R.

252—182; 260—75 NH, 77.5 AM